(12) United States Patent
Colavincenzo et al.

(10) Patent No.: US 9,651,040 B2
(45) Date of Patent: May 16, 2017

(54) UNLOADER VALVE APPARATUS FOR AN AIR COMPRESSOR

(71) Applicant: Bendix Commercial Vehicle Systems LLC, Elyria, OH (US)

(72) Inventors: David D Colavincenzo, Castalia, OH (US); Padraig B. Yeats, Avon Lake, OH (US); Tyler Johnson, Wellington, OH (US)

(73) Assignee: Bendix Commercial Vehicle Systems LLC, Elyria, OH (US)

(*) Notice: Subject to any disclaimer, the term of this patent is extended or adjusted under 35 U.S.C. 154(b) by 373 days.

(21) Appl. No.: 14/263,464

(22) Filed: Apr. 28, 2014

(65) Prior Publication Data
US 2015/0308426 A1   Oct. 29, 2015

(51) Int. Cl.
| | |
|---|---|
| F04B 49/00 | (2006.01) |
| F16K 31/00 | (2006.01) |
| F04B 49/03 | (2006.01) |
| B60T 17/02 | (2006.01) |
| F04B 39/10 | (2006.01) |
| F04B 49/24 | (2006.01) |
| F16K 31/122 | (2006.01) |
| B60T 17/04 | (2006.01) |

(52) U.S. Cl.
CPC ............. *F04B 49/03* (2013.01); *B60T 17/02* (2013.01); *B60T 17/04* (2013.01); *F04B 39/10* (2013.01); *F04B 49/24* (2013.01); *F16K 31/122* (2013.01)

(58) Field of Classification Search
CPC .............................. F16K 31/122; F04B 49/246
USPC ...................................... 251/87, 58; 417/311
See application file for complete search history.

(56) References Cited

U.S. PATENT DOCUMENTS

| | | | |
|---|---|---|---|
| 1,810,540 A | * | 6/1931 | Thomas .................. F04B 49/00 417/307 |
| 2,015,801 A | | 10/1935 | Johnson |
| 3,936,236 A | | 2/1976 | Day et al. |
| 4,094,231 A | * | 6/1978 | Carr ...................... F16K 31/143 251/58 |

(Continued)

FOREIGN PATENT DOCUMENTS

| | | |
|---|---|---|
| EP | 0254524 A2 | 7/1987 |
| WO | 2006068828 A1 | 6/2006 |

OTHER PUBLICATIONS

International Searching Authority, International Search Report, Aug. 19, 2015, 16 pages, Suropean Patent Office, Rijswijk Netherlands.

*Primary Examiner* — Charles Freay
*Assistant Examiner* — Christopher Bobish
(74) *Attorney, Agent, or Firm* — Cheryl L. Greenly; Brian E. Kondas; Eugene E. Clair (57) ABSTRACT

An unloader valve apparatus is provided for an air compressor. The unloader valve apparatus comprises a cylindrical piston having a longitudinal central axis and movable along the longitudinal central axis between a loaded position and an unloaded position. The unloader valve apparatus further comprises a stopper member pivotable about a pivot axis between a blocking position in which the stopper member blocks an unloader port when the piston is in the loaded position and an unblocking position in which the stopper member is not blocking the unloader port and is thereby allowing compressed air from the compressor to flow through the unloader port when the piston is in the unloaded position.

13 Claims, 4 Drawing Sheets

(56) References Cited

U.S. PATENT DOCUMENTS

| | | | |
|---|---|---|---|
| 4,338,857 A * | 7/1982 | Mason | F15B 15/066 |
| | | | 251/229 |
| 4,408,967 A | 10/1983 | Unger et al. | |
| 4,508,491 A | 4/1985 | Schaefer | |
| 5,411,239 A * | 5/1995 | Sorensen | F16K 31/163 |
| | | | 251/229 |
| 6,309,186 B1 | 10/2001 | Lafalce et al. | |
| 6,338,330 B1 * | 1/2002 | Jessberger | F02D 11/08 |
| | | | 123/389 |
| 7,270,145 B2 | 9/2007 | Koezler | |
| 8,573,113 B2 | 11/2013 | Oleniacz et al. | |
| 2007/0253838 A1 | 11/2007 | Leiss | |

* cited by examiner

UNLOADER VALVE APPARATUS FOR AN AIR COMPRESSOR

BACKGROUND

The present application relates to air compressors, and is particularly directed to an unloader valve apparatus for an air compressor such as a vehicle air compressor used in an air braking system of a heavy vehicle like a truck.

A truck air braking system includes a vehicle air compressor which builds air pressure for the air braking system. A governor controls system air pressure between a preset maximum and minimum pressure level by monitoring the air pressure in a supply reservoir. When the supply reservoir air pressure becomes greater than that of a preset "cut-out" setting of the governor, the governor controls the compressor to stop the compressor from building air. As the supply reservoir air pressure drops to a preset "cut-in" setting of the governor, the governor returns the compressor back to building air.

The vehicle air compressor is typically a reciprocating air compressor and runs continuously. The compressor runs either in a loaded mode or an unloaded mode. When the compressor is running in the loaded mode, compressed air is delivered to the air braking system. When the compressor is running in the unloaded mode, compressed air is directed to an alternate place which is other than the air braking system. Also, when the compressor is running in the unloaded mode, an unloader valve releases pressurized air building up inside the compressor to reduce the pressurized air in the compressor, which in turn reduces the load on the device driving the compressor. This minimizes power consumption during operation of the compressor in the unloaded mode.

A drawback in known unloader valves is the difficulty in servicing the unloader valves because of the way they are installed on their respective compressors. The compressor is usually mounted in a tight location within the vehicle chassis, making it difficult to service the unloader valve without having to first remove the compressor from the vehicle chassis. Another drawback in known unloader valves is their exposure to relatively high temperatures during operation with their respective compressors. It would be desirable to provide an unloader valve which overcomes drawbacks of known unloader valves.

SUMMARY

In accordance with one embodiment, an unloader valve apparatus is provided for an air compressor. The unloader valve apparatus comprises a cylindrical piston having a longitudinal central axis and movable along the longitudinal central axis between a loaded position and an unloaded position. The unloader valve apparatus further comprises a stopper member pivotable about a pivot axis between a blocking position in which the stopper member blocks an unloader port when the piston is in the loaded position and an unblocking position in which the stopper member is not blocking the unloader port and is thereby allowing compressed air from the compressor to flow through the unloader port when the piston is in the unloaded position.

In accordance with another embodiment, a vehicle air compressor apparatus is provided for a heavy vehicle braking system. The vehicle air compressor apparatus comprises a compressor crankcase assembly, and a compressor cylinder head assembly disposed on the crankcase assembly and co-operating with the crankcase assembly to generate compressed air. The cylinder head assembly includes (i) an air inlet port through which air can be received for compression within the crankcase and cylinder head assemblies, and (ii) a discharge port through which compressed air can be delivered from the cylinder head assembly. The vehicle air compressor apparatus further comprises an unloader valve assembly disposed between the crankcase and cylinder head assemblies and for unloading compressed air from the crankcase and cylinder head assemblies. The unloader valve assembly includes (i) a piston having a cut-out central chamber and movable between a loaded position in which the crankcase and cylinder head assemblies are running in loaded mode and an unloaded position in which the crankcase and cylinder head assemblies are running in unloaded mode, and (ii) a stopper member collapsible within the cut-out central chamber of the piston and movable between a blocking position in which a portion of the stopper member is located in the cut-out central chamber of the piston to block compressed air running in loaded mode from being vented to a location other than the discharge port and an unblocking position in which more of a portion of the stopper member is located in the cut-out central chamber of the piston to unblock compressed air in running unloaded mode to allow the compressed air running in unloaded mode to vent to a location other than the discharge port.

In accordance with yet another embodiment, a vehicle air compressor apparatus is provided for a heavy vehicle braking system. The vehicle air compressor apparatus comprises a compressor crankcase assembly, and a compressor cylinder head assembly disposed on the crankcase assembly and co-operating with the crankcase assembly to generate compressed air. The cylinder head assembly includes (i) an air inlet port through which air can be received for compression within the crankcase and cylinder head assemblies, and (ii) a discharge port through which compressed air can be delivered from the cylinder head assembly. The vehicle air compressor apparatus further comprises an unloader valve assembly connected internally of the crankcase and cylinder head assemblies. The unloader valve assembly includes (i) a cylindrical piston movable along a longitudinal central axis of the piston, and (ii) a stopper member pivotable about a pivot axis which extends transversely to the longitudinal central axis of the piston and between a blocking position in which the stopper member blocks compressed air from leaving the unloader port as compressed air is being delivered through the discharge port and a non-blocking position in which the stopper member allows compressed air to be unloaded from the crankcase and cylinder head assemblies.

In accordance with still another embodiment, a method is provided of servicing a vehicle air compressor apparatus. The method comprises removing the unloader valve assembly from side of the crankcase and cylinder head assemblies without having to remove the crankcase and cylinder head assemblies from the vehicle. The method also comprises after the unloader valve assembly has been removed from the side of the crankcase and cylinder head assemblies, servicing the unloader valve assembly. The method further comprises installing the serviced unloader valve assembly into the side of the crankcase and cylinder head assemblies.

DETAILED DESCRIPTION

Figure 1:
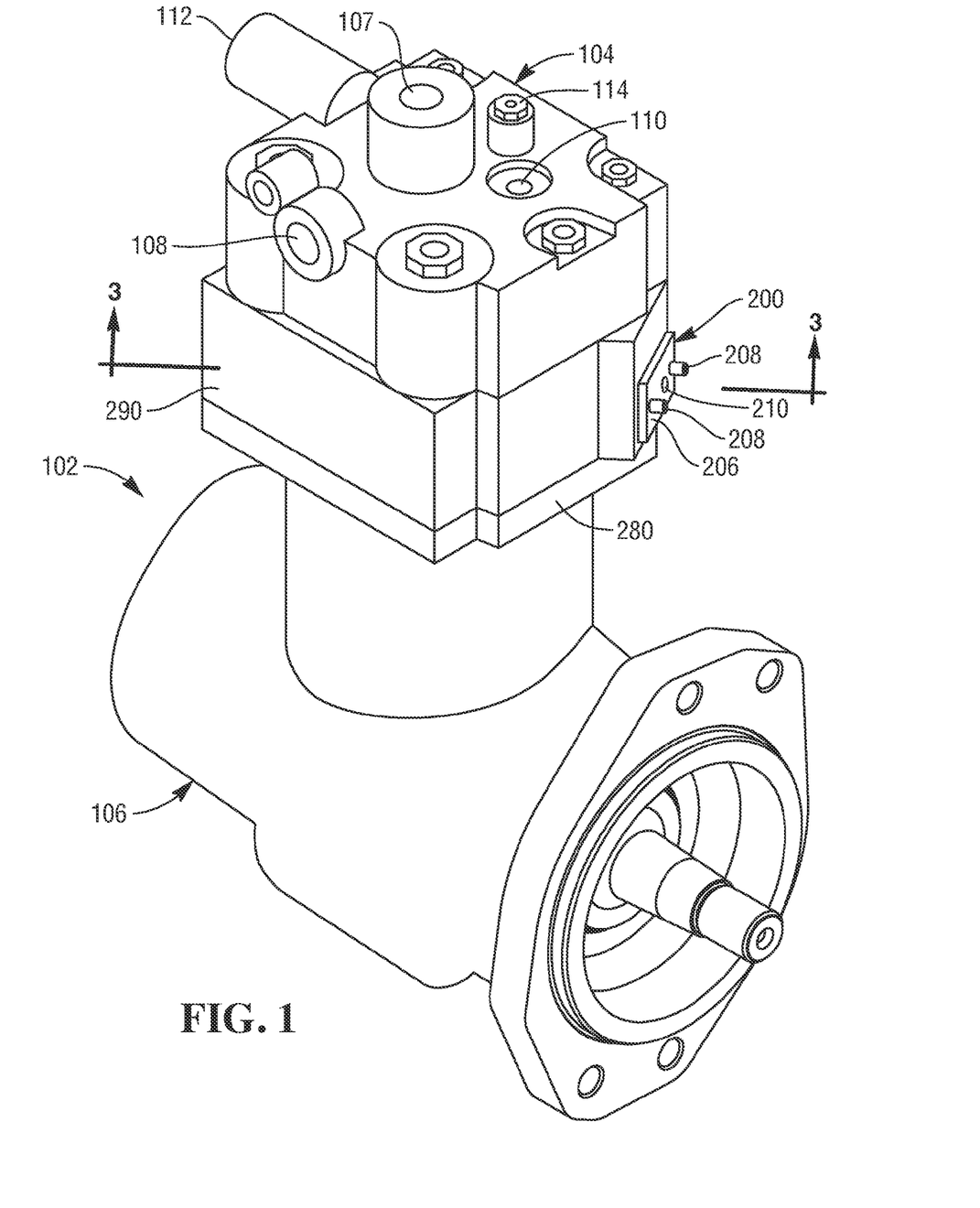
FIG. 1 is a perspective view of a vehicle air compressor including an unloader valve apparatus constructed in accordance with an embodiment.

Referring to FIG. 1, air compressor 102 includes compressor cylinder head assembly 104 disposed on compressor crankcase assembly 106 in known manner. Components of crankcase assembly 106 and components of cylinder head assembly 104 co-operate together to generate compressed air. Compressor 102 may be based on design of a Bendix BA-921® Compressor commercially available from Bendix Commercial Vehicle Systems LLC located in Elyria. Ohio.

Cylinder head assembly 104 includes air inlet port 107 through which air can be received for compression within the crankcase assembly 106 and cylinder head assembly 104. Cylinder head assembly 104 includes discharge port 110 through which compressed air can be delivered from cylinder head assembly 104. A pair of coolant ports 108, 112 is provided through which coolant can flow to cool cylinder head assembly 104 as compressed air is being generated. Cylinder head assembly 104 further includes safety valve port 114, and governor port 210 which is connectable via a pneumatic control line (not shown) to a governor (also not shown).

Compressor 102 further includes unloader valve assembly 200 which is disposed between crankcase assembly 106 and cylinder head assembly 104. Unloader valve assembly 200 includes valve plate 280 which adjoins crankcase assembly 106 and cooling plate 290 which adjoins cylinder head assembly 104 and is on valve plate 280. Cover plate 206 is fastened to cooling plate 290 with a pair of suitable screws 208. The governor port 210 is through the cover plate 206, and is connectable to a pneumatic control line from a governor (both not shown).

Figure 2:
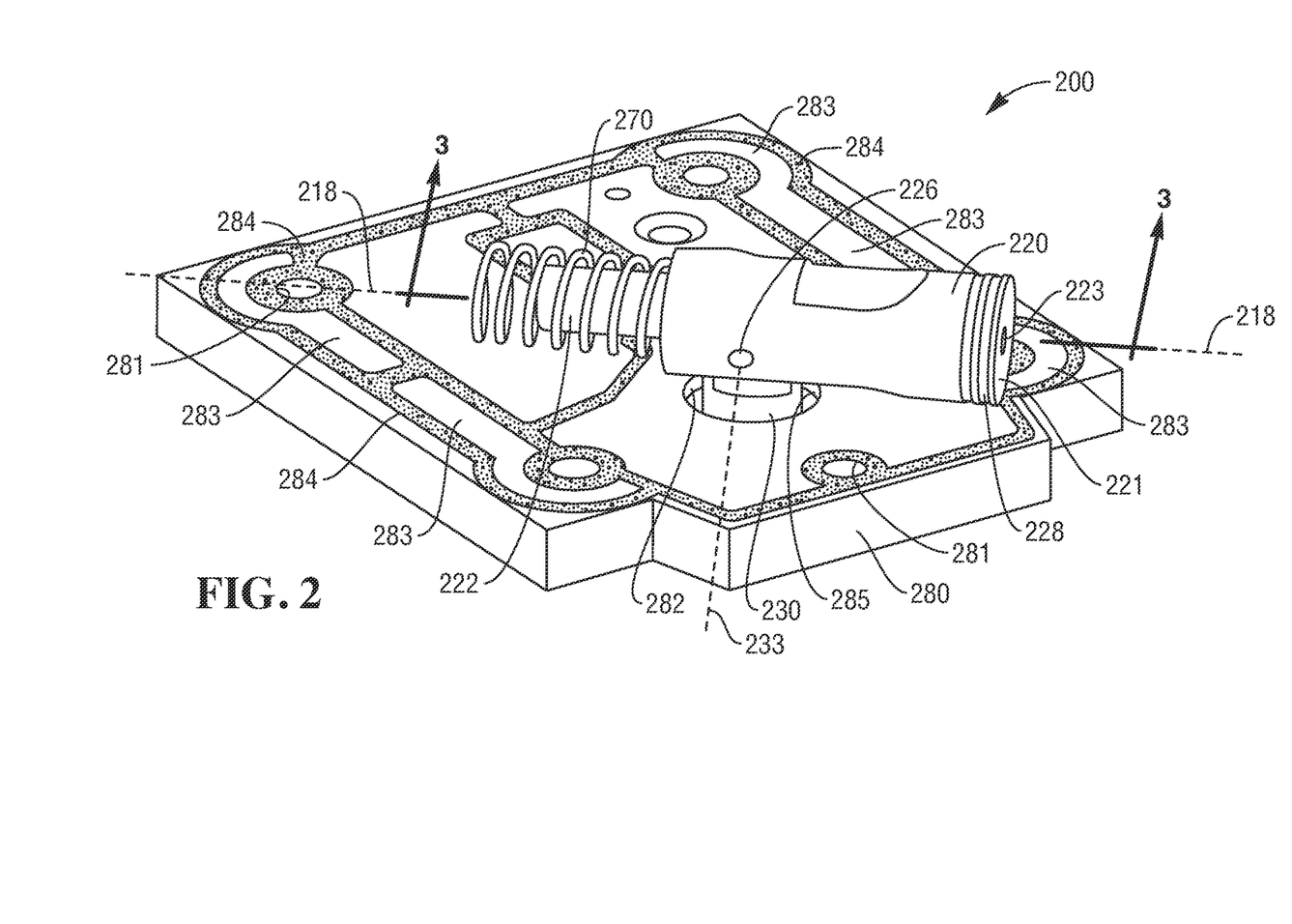
FIG. 2 is an enlarged view of a portion of FIG. 1 with some parts removed.
Figure 3:
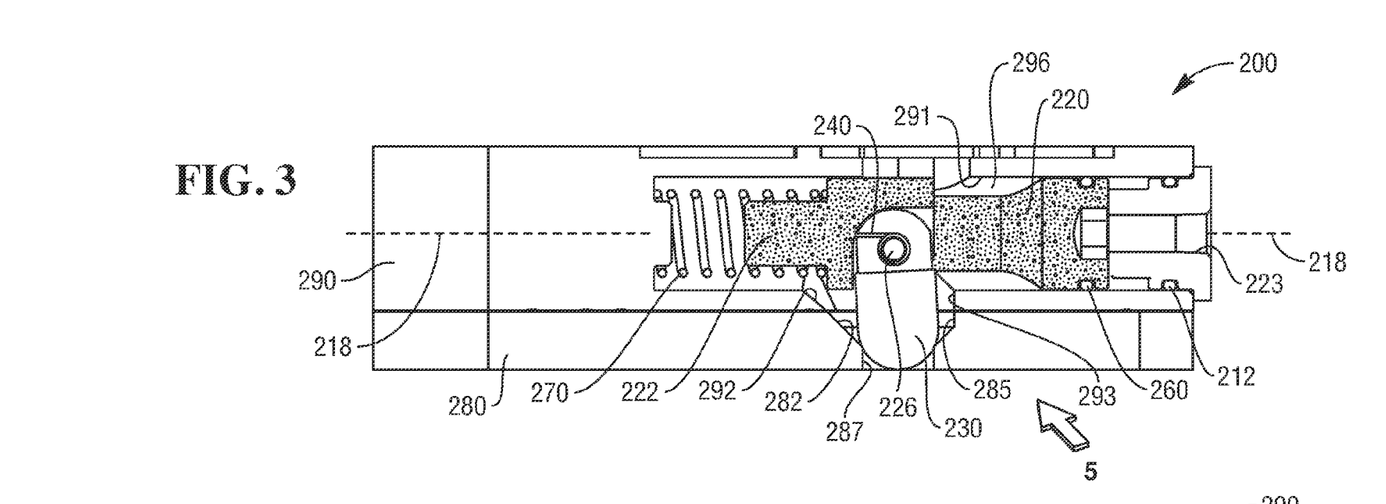
FIG. 3 is a sectional view taken approximately along line 3-3 shown in FIG. 1 and corresponding to the same line 3-3 shown in FIG. 2 with some parts removed.
Figure 4:
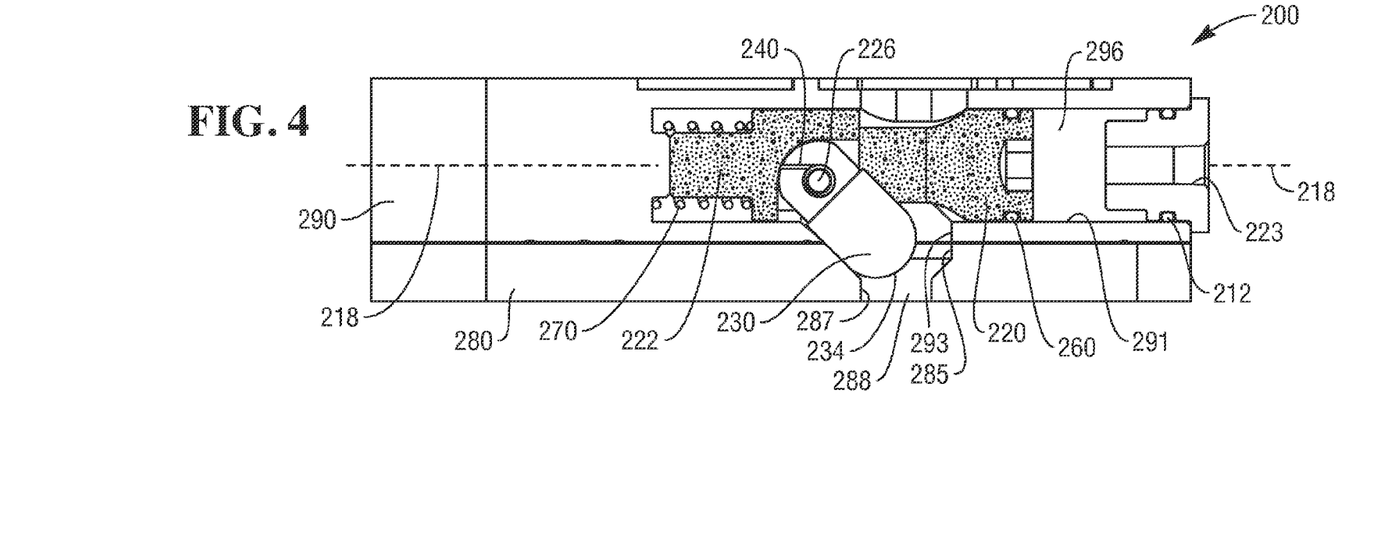
FIG. 4 is a sectional view similar to FIG. 3, and showing parts in different positions.
Figure 5:
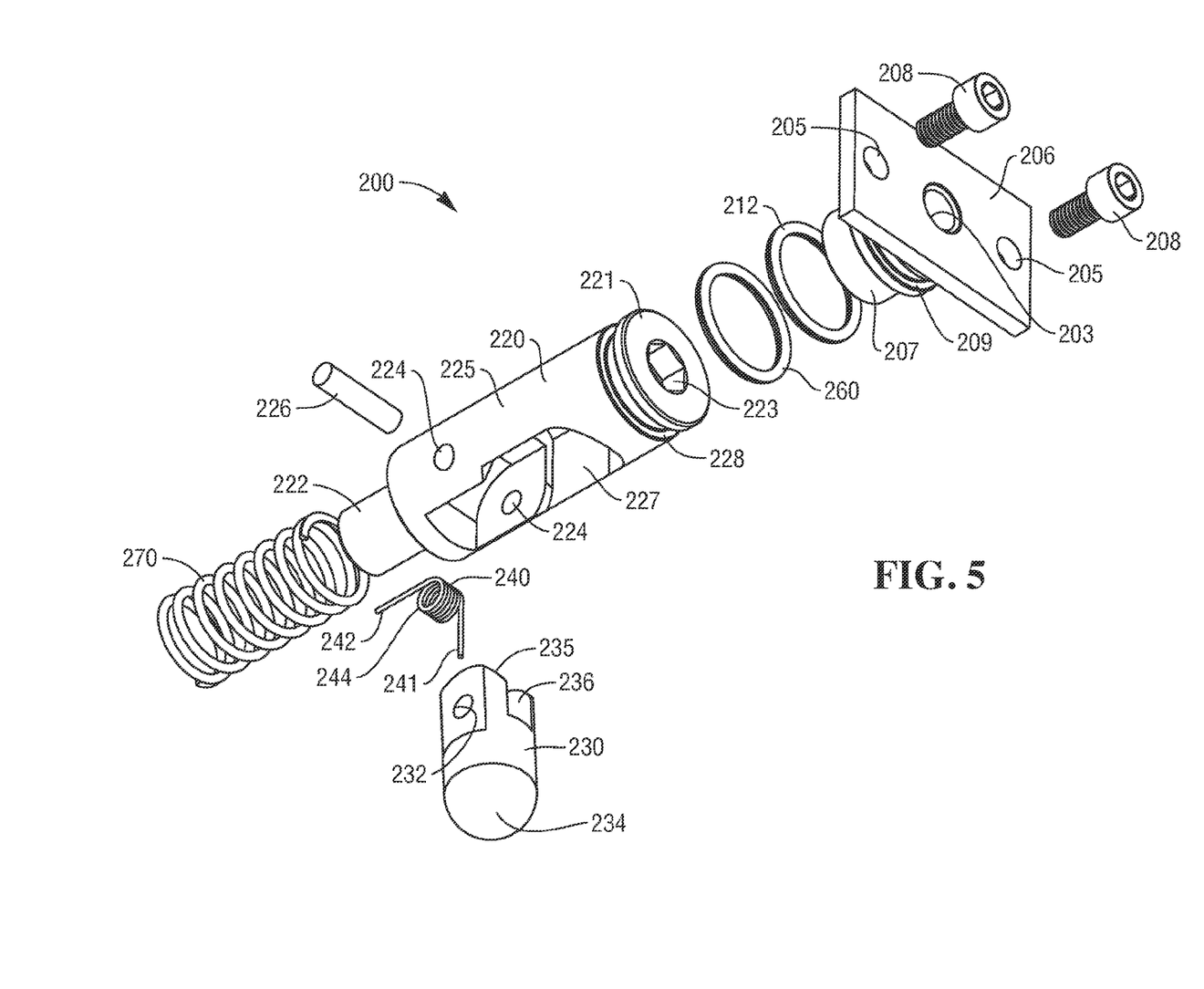
FIG. 5 is a perspective view looking approximately in the direction of arrow "5" shown in FIG. 3, and showing certain parts in an exploded view.

Referring to FIG. 2, an enlarged view of a portion of unloader valve assembly 200 of FIG. 1 with parts removed is illustrated. Referring to FIG. 3, a sectional view taken approximately along line 3-3, shown in FIG. 1 is illustrated. It should be noted that line 3-3 shown in FIG. 2 corresponds to the same line 3-3 shown in FIG. 1. Referring to FIG. 4, a sectional view similar to FIG. 3 and showing parts in different positions is illustrated. Referring to FIG. 5, a perspective view, looking approximately in the direction of arrow "5" shown in FIG. 3, is illustrated. The perspective view of FIG. 5 shows an exploded view of components of unloader valve assembly 200.

Cover plate 206 (FIGS. 1 and 5) has opening 203 for the governor port 210 (FIG. 1) through the cover plate 206. Cover plate 206 also has a pair of openings 205 through which screws 208 fasten cover plate 206 to cooling plate 290 shown in FIG. 1. An extended cylindrical portion 207 (FIG. 5) is disposed on opposite side of cover plate 206. O-ring groove 209 is disposed on extended cylindrical portion 207, and O-ring 212 is fitted in O-ring groove 209.

Referring to FIGS. 2-5, generally cylindrical piston 220 has longitudinal central axis 218, and is movable along longitudinal central axis 218 between a position shown in FIG. 3 and a position shown in FIG. 4. Piston 220 includes first end portion 221 which has opening 223, and second end portion 222 which has smaller diameter than central body portion 225 (FIG. 5) of piston 220. Piston 220 also has a pair of openings 224 (best shown in FIG. 5) through which pivot pin 226 can pass through.

Stopper member 230 includes an end portion 234 which has a spherical end, and an opposite end portion 235 which has notch opening 236 (FIG. 5). Biasing member 240 in the form of a torsion spring is disposed in notch opening 236 of stopper member 230. Torsion spring 240 will also be referred to herein as stopper spring 240. More specifically, one end 241 of stopper spring 240 is secured to an interior surface in notch opening 236 of stopper member 230, and the other end 242 of stopper spring 240 is secured to an interior surface in cut-out central chamber 227 of piston 220. Stopper member 230 is sized such that the entire body of stopper member 230 is capable of fitting inside piston 220 to facilitate either removing the piston 220 or installing the piston 220, as will be described in detail later.

Pivot pin 226 extends through a pair of openings 232 (only one of which is visible in FIG. 5) of stopper member 230 and opening 244 of stopper spring 240. Opposite ends of pivot pin 226 are press-fitted in the pair of openings 224 of piston 220 to secure stopper member 230 and stopper spring 240 as a unit within cut-out central chamber 227 of piston 220. O-ring 260 is fitted into O-ring groove 228 in first end portion 221 of piston 220. O-ring 260 provides an air-tight seal between a bearing surface on first end portion 221 of piston 220 and bearing surfaces on cooling plate 290. A biasing member in form of a coil spring 270 is fitted onto second end portion 222 of piston 220. Coil spring 270 will also be referred to herein as piston spring 270.

Cooling plate 290 has a first surface 291 (FIGS. 3 and 4) which defines a piston opening 296 in which piston 220 is disposed. Piston 220 is movable through piston opening 296 between the position shown in FIG. 3 and the position shown in FIG. 4. Cooling plate 290 also has a second surface 292 which extends at an angle relative to the first surface 291, and a third surface 293 which extends perpendicular to the first surface 291. Second surface 292 of cooling plate 290 aligns with a first surface 282 (FIG. 3) of valve plate 280. First surface 282 of valve plate 280 extends at an angle relative to a second surface 287 of valve plate 280. Second surface 287 of valve plate 280 defines a stopper opening 288 (FIG. 4). Also, third surface 293 of cooling plate 290 aligns with a third surface 285 of valve plate 280.

Second surface 292 of cooling plate 290 and first surface 282 of valve plate 280 are aligned such that these surfaces act as guide surfaces for stopper member 230 when stopper member 230 moves between the position shown in FIG. 3 and the position shown in FIG. 4 as stopper member pivots about pivot axis 233 (FIG. 2) which passes through pivot pin 226. Pivot axis 233 of stopper member 230 extends transversely, such as perpendicularly, to longitudinal central axis 218 of piston 220. The angle of first surface 282 of valve plate 280 and second surface 292 of cooling plate 290 provide leading guide for stopper member 230 to retract into piston 220 when parts are moving from the position shown in FIG. 3 to the position shown in FIG. 4.

It should be noted that the positions of piston 220 and stopper member 230 shown in FIG. 2 are similar to the same positions of piston 220 and stopper member 230 shown in FIG. 3. When stopper member 230 is in the position shown in FIG. 3, stopper member 230 is blocking stopper opening 288. When stopper member 230 is in the position shown in FIG. 4, stopper member 230 is not blocking stopper opening 288.

Second surface 287 of valve plate 280 is chamfered to provide a seat for the spherical end of stopper member 230 to seal against when parts are in the position shown in FIG. 3. The spherical end shape of stopper member 230 allows it to be less than perpendicular and still seal against the chamfered second surface 287 of valve plate 280. Stopper opening 288 is also known as the unloader port.

As shown in FIG. 2, valve plate 280 includes gasket material 284 which is disposed between valve plate 280 and cooling plate 290 (not shown in FIG. 2) to provide a fluid-tight seal of a plurality of cooling channels 283 (shown only in FIG. 2) through which coolant flows. A plurality of bolt holes 281 are provided to receive bolts therethrough to secure valve plate 280 and cooling plate 290 together to provide the fluid-tight seal of the cooling channels 283.

When compressor 102 is running in loaded mode, piston 220 and stopper member 230 are in their positions shown in FIG. 3. When compressor 102 is running in unloaded mode, piston 220 and stopper member 230 are in their positions shown in FIG. 4. The positions of piston 220 and stopper member 230 shown in FIG. 3 will be referred to as the loaded position, the loaded mode, or the blocking position. The positions of piston 220 and stopper member 230 shown in FIG. 4 will be referred to as the unloaded position, the unblocking position, or the non-blocking position.

During operation in loaded mode, the governor (not shown) is not providing a pneumatic control signal pressure through governor port 210 (FIG. 1) to opening 223 in piston 220. Since there is no control signal pressure, the biasing force of piston spring 270 will not be overcome to move piston 220. Both the biasing force of piston spring 270 and the biasing force of stopper spring 240 co-operate to maintain stopper member 230 in the loaded position shown in FIG. 3 to block compressed air from being vented through unloader port 287 in valve plate 280.

When operation of compressor 102 changes from loaded mode to unloaded mode, the governor provides a sufficient control signal pressure to opening 223 of piston 220 to begin moving piston 220 against the biasing force of piston spring 270 to the left as viewed looking at FIG. 3. Stopper member 230 begins pivoting about pivot axis 233 and (partially or fully) folds into cut-out central chamber 227 of piston 220 following first surface 282 of valve plate 280 and second surface 292 of cooling plate 290. Stopper member 230 also begins to unblock unloader port 287 in valve plate 280, and compressed air begins to vent through unloader port 287 to direct the compressed air to a desired location such as a closed room volume within cylinder head assembly 104. The venting and directing of compressed air to a closed room volume are known in the operation of air compressors and, therefore, will not be described. Alternatively, the compressed air can be vented to atmosphere or some other desired location. Parts continue to move to the left from the loaded position of FIG. 3 until parts reach the unloaded position of FIG. 4.

When operation of compressor 102 changes back from unloaded mode to loaded mode, the governor reduces the control signal pressure to opening 223 of piston 220 to allow the biasing force of piston spring 270 to move piston 220 to the right as viewed looking at FIG. 4. Stopper member 230 begins pivoting about pivot axis 233 by the biasing force of stopper spring 240 back to the loaded position shown in FIG. 3, and compressed air is again blocked from venting compressed air through unloader port 287 in valve plate 280.

The arrangement of piston 220 and stopper member 230 which is collapsible within cut-out central chamber 227 of piston 220 allows stopper member 230 to seal unloader port 287 in valve plate 280 during operation of compressor 102 in loaded mode up to a pressure of about 200 to about 400 pounds per square inch (psi) for example. The necessary force to seal unloader port 287 in valve plate 280 comes from the biasing force of piston spring 270 and the resulting mechanical advantage created by the fulcrum of piston 220, stopper member 230, and pivot pin 226. If stopper member 230 is perpendicular to piston 220 and is covering unloader port 287 in valve plate 280, then no amount compressed air pressure against the unloader port 287 should be able to move stopper member 230 off of unloader port 287 because there is no resultant force transverse to stopper member 230. Accordingly, it should be apparent that the compressed air pressure required to move stopper member 230 off of unloader port 287 in valve plate 280 varies as a function of the angle of stopper member 230 relative to piston 220.

Also, the arrangement of piston 220 and stopper member 230 which is collapsible within cut-out central chamber 227 of piston 220 provides an unloader valve which is relatively simple and reliable to operate as well as to remove and replace when servicing is needed. The simplicity and reliability are a result of using only a single O-ring 260 (FIG. 5) which is disposed on one end of piston 220 and away from unloader port 287 through which relatively hot compressed air passes when compressor 102 is running in unloaded mode.

The unloader valve assembly 200 cannot be removed when the unloader valve assembly is in the loaded position. However, when it is time to remove the unloader valve assembly 200, there should be no pressure in compressor 102. Accordingly, when no air pressure is applied to the unloader port 287, the unloader valve assembly 200 can be removed from the cooling plate 290.

To remove the unloader valve assembly 200, the cover plate 206 of unloader valve assembly 200 is first removed. After cover plate 206 is removed, the piston 220 can be pushed in and turned about 90 degrees by a tool, such as an Allen wrench or screwdriver. When the piston 220 is turned, it is unbiased and both the piston 220 and the stopper 230 can be pulled out of the cooling plate 290 as a single piece. Although the amount of turning of the piston 220 to remove the piston is disclosed as being about 90 degrees, it is conceivable that the amount of turning of the piston 220 to remove or install it may be other than 90 degrees.

The unloader valve assembly 200 can be installed as a single piece back into the cooling plate 290. More specifically, the piston 220 and the stopper member 230 are inserted as a single piece into piston opening 296. The piston 220 and the stopper 230 should be oriented such that the stopper member 230 is in line with the unloader port 287. This alignment of the stopper member 230 with the unloader port 287 enables the piston 220 and the stopper member 230 to slide in correctly without twisting.

A number of advantages result by providing unloader valve assembly 200 constructed in accordance with the above embodiment. One advantage is that the arrangement of piston 220 and collapsible stopper member 230 allows components of unloader valve assembly 200 to be easily removed and replaced from side of compressor 102 without having to remove compressor 102 from its mounted location in the vehicle engine. The result is less time and cost involved in servicing compressor 102 when parts of unloader valve assembly 200 need to be serviced.

Another advantage is that single O-ring 260 disposed on first end portion 221 of piston 220 is exposed to relatively lower temperatures since O-ring 260 is positioned on piston 220 adjacent to cooling channels 283 (FIG. 2) and away from unloader port 287 in valve plate 280. The result is improved reliability and longer times between when unloader valve assembly 200 needs to serviced and replaced.

Although the above-description describes each of piston 220 and collapsible stopper member 230 having type and shape as best shown in the exploded view of FIG. 5, it is conceivable that each of piston and stopper member may be of a different type and have a different shape.

Also, although the above-description describes each of stopper spring 240 and piston spring 270 having type and shape as best shown in the exploded view of FIG. 5, it is conceivable that each of stopper spring and piston spring may be of a different type and have a different shape.

Although the above-description describes a compressor which has been modified to provide the arrangement of piston 220 and stopper member 230, it is conceivable that a new compressor can be manufactured to provide the arrangement of piston 220 and the stopper member 230 which is collapsible within cut-out central chamber 227 of piston 220.

Further, although the above-description describes unloader valve assembly 200 being used in a heavy vehicle such as a truck, it is conceivable that unloader valve assembly 200 may be used in other types of heavy vehicles, such as busses for example.

While the present invention has been illustrated by the description of example processes and system components, and while the various processes and components have been described in detail, applicant does not intend to restrict or in any way limit the scope of the appended claims to such detail. Additional modifications will also readily appear to those skilled in the art. The invention in its broadest aspects is therefore not limited to the specific details, implementations, or illustrative examples shown and described. Accordingly, departures may be made from such details without departing from the spirit or scope of applicant's general inventive concept.

What is claimed is:

1. An unloader valve apparatus for an air compressor, the unloader valve apparatus comprising:
   a cylindrical piston having a cut-out central chamber and a longitudinal central axis and movable along the longitudinal central axis between a loaded position and an unloaded position;
   a stopper member collapsible within the cut-out central chamber of the cylindrical piston and pivotable about a pivot axis between a blocking position in which the stopper member blocks an unloader port when the piston is in the loaded position and an unblocking position in which the stopper member is not blocking the unloader port and is thereby allowing compressed air from the compressor to flow through the unloader port when the piston is in the unloaded position and;
   a first biasing member arranged to (i) bias the stopper member in a direction about the pivot axis of the stopper member to move the stopper member from the unblocking position to the blocking position when the piston moves from the unloaded position to the loaded position, and (ii) bias the stopper member to maintain the stopper member in the blocking position when the piston is at the loaded position, wherein the first biasing member comprises a torsion spring connectable between an interior surface of the piston and an interior surface of the stopper member.

2. An unloader apparatus according to claim 1, wherein the pivot axis of the stopper member extends transversely to the longitudinal central axis of the piston.

3. An unloader valve apparatus according to claim 1, further comprising:
   a second biasing member arranged to (i) bias the piston at a second end portion of the piston in a direction along the longitudinal central axis of the piston to move the piston from the unloaded position to the loaded position when the compressor changes from running in the unloaded mode to running in the loaded mode, and (ii) bias the piston to maintain the piston in the loaded position when the compressor is running in the loaded mode.

4. An unloader valve apparatus according to claim 3, wherein the second biasing member comprises a coil spring connectable between an exterior surface of the piston and an interior surface of the compressor.

5. An unloader valve apparatus according to claim 3, further comprising:
   an O-ring disposed at a first end portion of the piston which is opposite the second end portion of the piston spaced apart along the longitudinal central axis of the piston from the pivot axis of the stopper member, wherein the O-ring provides an air-tight seal between a bearing surface on the first portion of the piston and a bearing surface within the compressor.

6. An unloader valve apparatus according to claim 3, wherein the piston is responsive to a control signal pressure to move the piston against bias of the second biasing member and thereby to move the piston from the loaded position to the unloaded position.

7. An unloader valve apparatus according to claim 1, wherein the stopper member is capable of blocking the unloader port up to a pressure of about 200 to about 400 pounds per square inch (psi).

8. A vehicle air compressor apparatus for a heavy vehicle braking system, the vehicle air compressor apparatus comprising:
   a compressor crankcase assembly;
   a compressor cylinder head assembly disposed on the crankcase assembly and co-operating with the crankcase assembly to generate compressed air, wherein the cylinder head assembly includes (i) an air inlet port through which air can be received for compression within the crankcase and cylinder head assemblies, and (ii) a discharge port through which compressed air can be delivered from the cylinder head assembly; and
   an unloader valve assembly disposed between the crankcase and cylinder head assemblies and for unloading compressed air from the crankcase and cylinder head assemblies, wherein the unloader valve assembly includes (i) a piston having a cut-out central chamber and movable between a loaded position in which the crankcase and cylinder head assemblies are running in loaded mode and an unloaded position in which the crankcase and cylinder head assemblies are running in unloaded mode, and (ii) a stopper member collapsible within the cut-out central chamber of the piston and movable between a blocking position in which a portion of the stopper member is located in the cut-out central chamber of the piston to block compressed air running in loaded mode from being vented to a location other than the discharge port and an unblocking position in which more of a portion of the stopper member is located in the cut-out central chamber of the piston to unblock compressed air in running unloaded mode to allow the compressed air running in unloaded mode to vent to a location other than the discharge port.

9. A vehicle air compressor apparatus according to claim 8, further comprising:
   a first biasing member arranged to (i) bias the stopper member in a direction about a pivot axis of the stopper member to move the stopper member from the unblocking position to the blocking position when the piston moves from the unloaded position to the loaded position, and (ii) bias the stopper member to maintain the stopper member in the blocking position when the piston is at the loaded position; and
   a second biasing member arranged to (i) bias the piston at an end portion of the piston in a direction along a longitudinal central axis of the piston to move the piston from the unloaded position to the loaded position when the compressor changes from running in the unloaded mode to running in the loaded mode, and (ii) bias the piston to maintain the piston in the loaded position and the stopper member in the blocking position when the compressor is running in the loaded mode.

10. A vehicle air compressor apparatus according to claim 9, wherein (i) the first biasing member comprises a torsion spring connectable between an interior surface of the piston and an interior surface of the stopper member, and (ii) the second biasing member comprises coil spring connectable between a surface of the piston and an interior surface of the compressor.

11. A vehicle air compressor apparatus according to claim 10, further comprising:
   an O-ring disposed at an opposite end portion of the piston spaced apart along the longitudinal central axis of the piston from the pivot axis of the stopper member, wherein the O-ring provides an air-tight seal between a bearing surface on the piston and a bearing surface within the crankcase and cylinder head assemblies.

12. A vehicle air compressor apparatus for a heavy vehicle braking system, the vehicle air compressor apparatus comprising:
   a compressor crankcase assembly;
   a compressor cylinder head assembly disposed on the crankcase assembly and co-operating with the crankcase assembly to generate compressed air, wherein the cylinder head assembly includes (i) an air inlet port through which air can be received for compression within the crankcase and cylinder head assemblies, and (ii) a discharge port through which compressed air can be delivered from the cylinder head assembly; and
   an unloader valve assembly connected internally of the crankcase and cylinder head assemblies and including (i) a cylindrical piston having a cut-out central chamber and movable along longitudinal central axis of the piston, and (ii) a stopper member collapsible within the cut-out central chamber of the cylindrical piston and pivotable about a pivot axis which extends transversely to the longitudinal central axis of the piston and between a blocking position in which the stopper member blocks compressed air from leaving the unloader port as compressed air is being delivered through the discharge port and a non-blocking position in which the stopper member allows compressed air to be unloaded from the crankcase and cylinder head assemblies.

13. A vehicle air compressor apparatus according to claim 12, wherein the longitudinal central axis of the piston and the pivot axis of the stopper member are perpendicular to each other.

* * * * *